United States Patent
Tinker et al.

(10) Patent No.: US 10,046,768 B2
(45) Date of Patent: Aug. 14, 2018

(54) HIGH SPEED DOWNSHIFT MANAGEMENT

(71) Applicant: Caterpillar Inc., Peoria, IL (US)

(72) Inventors: Matthew Michael Tinker, Peoria, IL (US); Randy T. Anderson, Peoria, IL (US); Michael D. Anderson, Germantown Hills, IL (US)

(73) Assignee: Caterpillar Inc., Deerfield, IL (US)

( * ) Notice: Subject to any disclaimer, the term of this patent is extended or adjusted under 35 U.S.C. 154(b) by 610 days.

(21) Appl. No.: 14/560,992

(22) Filed: Dec. 4, 2014

(65) Prior Publication Data
US 2016/0159355 A1 Jun. 9, 2016

(51) Int. Cl.
| | |
|---|---|
| *B60W 10/06* | (2006.01) |
| *B60W 10/10* | (2012.01) |
| *B60W 10/11* | (2012.01) |
| *B60W 10/18* | (2012.01) |
| *B60W 30/184* | (2012.01) |
| *B60W 30/18* | (2012.01) |

(52) U.S. Cl.
CPC .......... *B60W 30/184* (2013.01); *B60W 10/06* (2013.01); *B60W 10/10* (2013.01); *B60W 10/11* (2013.01); *B60W 10/18* (2013.01); *B60W 30/18063* (2013.01); *B60W 2300/17* (2013.01); *B60W 2510/0638* (2013.01); *B60W 2510/10* (2013.01); *B60W 2510/1005* (2013.01); *B60W 2520/10* (2013.01); *B60W 2550/142* (2013.01); *B60W 2720/10* (2013.01)

(58) Field of Classification Search
CPC ......... B60W 10/06; B60W 2510/0638; B60W 10/10; B60W 10/11; B60W 2510/10; B60W 2510/1005; B60W 10/18; B60W 10/184; B60W 30/184; B60W 2300/17; B60W 2520/10; B60W 2550/142; B60W 2720/10; F16H 59/044
See application file for complete search history.

(56) References Cited

U.S. PATENT DOCUMENTS

| | | | |
|---|---|---|---|
| 6,979,280 B2 | 12/2005 | Oshima et al. | |
| 7,608,014 B2 | 10/2009 | Kobiki et al. | |
| 8,016,717 B2 * | 9/2011 | Ebner | B60K 6/48 180/65.275 |
| 2009/0036266 A1 * | 2/2009 | Kondou | B60T 7/126 477/92 |
| 2010/0304922 A1 | 12/2010 | Ohkubo et al. | |
| 2011/0307152 A1 * | 12/2011 | Shono | B60W 10/06 701/54 |

FOREIGN PATENT DOCUMENTS

JP 2003301941 10/2003

* cited by examiner

*Primary Examiner* — Terry C Chau
(74) *Attorney, Agent, or Firm* — Miller, Matthias & Hull

(57) ABSTRACT

In order to reduce drivetrain component wear and tear, a machine monitors for an impending downshift and automatically slows the machine to a speed that keeps engine rpm below a target engine rpm before the downshift is completed. A controller in the machine determines the current speed of the machine and then slows the machine to a new speed associated with the target rpm in the new gear. The controller may simply apply the brakes to slow the machine to the new speed independently of the process of changing gears or may actively delay the gear change until the new speed is achieved.

16 Claims, 4 Drawing Sheets

HIGH SPEED DOWNSHIFT MANAGEMENT

TECHNICAL FIELD

The present disclosure relates to management of shifting in large machines, and more particularly coordination of braking with downshifting in those machines.

BACKGROUND

A machine driven by an engine or motor that uses a transmission or similar powertrain can decelerate by placing the machine in a lower gear so that torque in the engine can be used to slow the machine. When the machine downshifts while running at a high rate of speed, a large negative torque can be transmitted through the entire drivetrain causing a sudden and dramatic increase in engine and other drivetrain component angular velocity (i.e., revolutions per minute), potentially causing damage or undue wear on drivetrain components including differentials, transmissions, torque converters, and engine components such as crankshafts and piston rods.

U.S. Pat. No. 6,979,280 ("the '280 patent") describes a system that applies braking force during a downshift to achieve a pre-determined target deceleration value. The '280 patent requires that the brake already be applied when the downshift is requested and targets a deceleration value but fails to disclose a braking system that acts to achieve a particular target machine speed or engine revolutions per minute (rpm) before downshifting.

SUMMARY OF THE DISCLOSURE

In one aspect of the disclosure, a system for controlling wear to drivetrain components during downshifting in a machine includes a transmission, a gear selector electronically coupled to the transmission, a brake mechanism configured for remote activation, and a controller coupled to the gear selector and the brake mechanism. The controller may be configured to receive a signal via the gear selector to change the transmission from a current gear to a new gear, the new gear lower than the current gear, calculate a new engine revolutions per minute (rpm) corresponding to operating the transmission in the new gear, determine that the new engine rpm is above a target engine rpm, and determine a new speed of the machine at which the new engine rpm in the new gear will be at or below the target engine rpm. The controller may be configured to then activate the brake mechanism to slow the machine to the new speed prior to the transmission engaging the new gear.

In another aspect of the disclosure, a method of controlling wear to drivetrain components in a machine during downshifting may include receiving a request to downshift to a new gear, prior to performing the downshift to the new gear, estimating a new revolutions per minute (rpm) of an engine corresponding to the new gear, and when an estimated new engine rpm is above a target rpm, determining a new speed of the machine that corresponds to the target rpm when in the new gear. The method may continue by applying a brake to slow the machine to the new speed prior to shifting to the new gear.

In yet another aspect of the disclosure, a method of controlling wear to drivetrain components in a machine during downshifting may include determining a current speed of the machine, receiving a request to downshift from a current gear to a new gear, and prior to changing to the new gear, determining a revolutions per minute (rpm) of a drivetrain component in the new gear. When the rpm of the drivetrain component in the new gear is above a target rpm, determining a new speed at which the rpm of the drivetrain component will remain below the target rpm and slowing the machine to the new speed prior to changing to the new gear.

DETAILED DESCRIPTION

Figure 1:
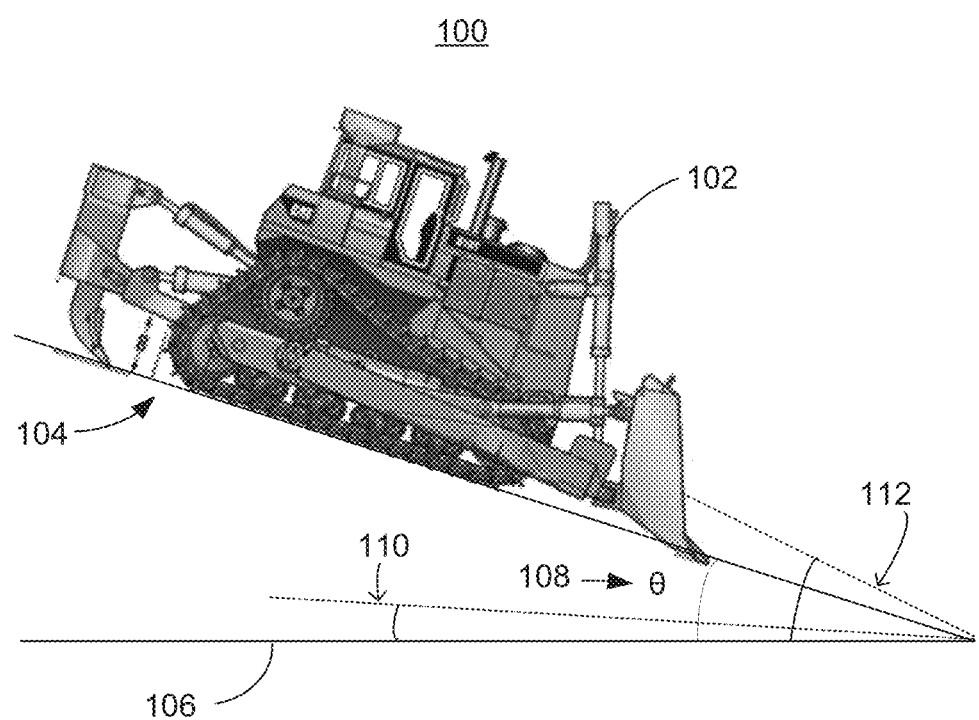
FIG. 1 is a side view of a machine on a favorable incline.

FIG. 1 illustrates a worksite 100 with a machine 102 in forward motion on a in a downhill attitude on a favorable incline 104. The incline 104 may be at an angle θ 108 measured from the horizontal 106. The incline 104 is labeled favorable in that it tends to increase forward speed. Shallower angle 110 and steeper angle 112 are also illustrated. The machine 102 may be virtually any machine that uses engine braking to slow itself, including, but not limited to track-type tractors, dozers, articulated trucks, on-highway and off-highway trucks.

Figure 2:
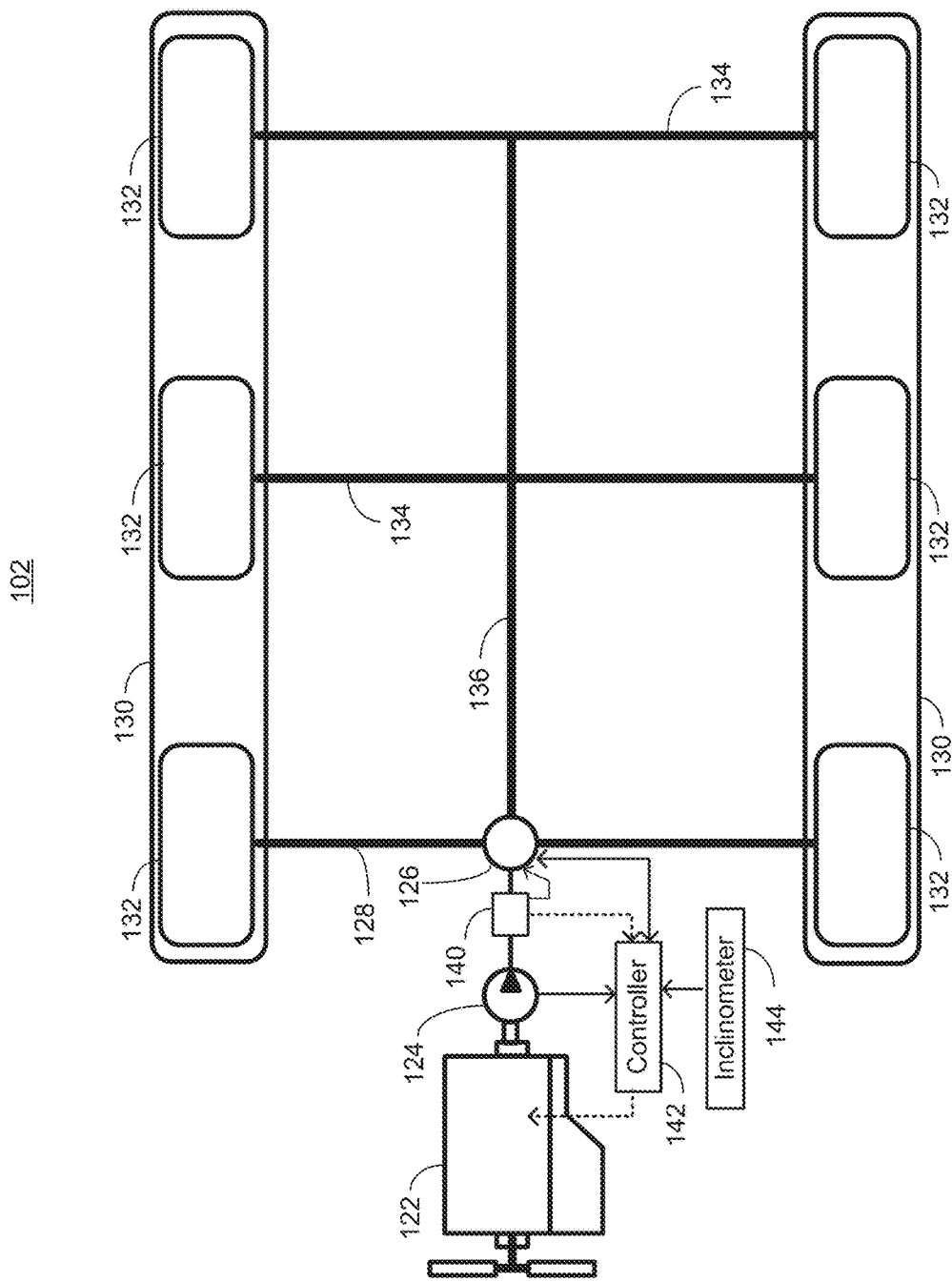
FIG. 2 is a block diagram of the machine of FIG. 1 illustrating elements relevant to downshift management.

FIG. 2 is a highly simplified block diagram of a machine 102 illustrated in FIG. 1. In this exemplary embodiment, the machine 102 is shown as having an engine 122, a torque converter 124, and a transmission 126 that drives an axle 128 and drive wheels 132 that in turn drive a track 130. Additional drive wheels 132 may be connected by axles 134 and driven via a driveshaft 136. In practice, the drivetrain may be significantly more complex and may include inter-axle differentials and cross-axle differentials to improve traction, which are beyond the scope of the current disclosure. Other vehicle or machine types may have different drivetrain and drive wheel configurations that are equally applicable to downshift management.

The machine 102 may also include a controller 142. The controller 142 may receive inputs from the torque converter 124, the transmission 126, and an instrument capable of reporting an angle of the vehicle, such as an accelerometer or an inclinometer 144. The controller 142 may also receive a signal from a gear selector 140 in an operator station (not depicted). The signal may reflect an operator selection of a gear setting for the transmission 126. In an embodiment, the gear selector 140 may be coupled directly to the transmission 126 or a separate transmission controller (not depicted). In another embodiment, the gear selector 140 may be connected to the controller 142 so that the operator requested gear selection is an input to the controller 142, which may also control the transmission 126.

Figure 3:
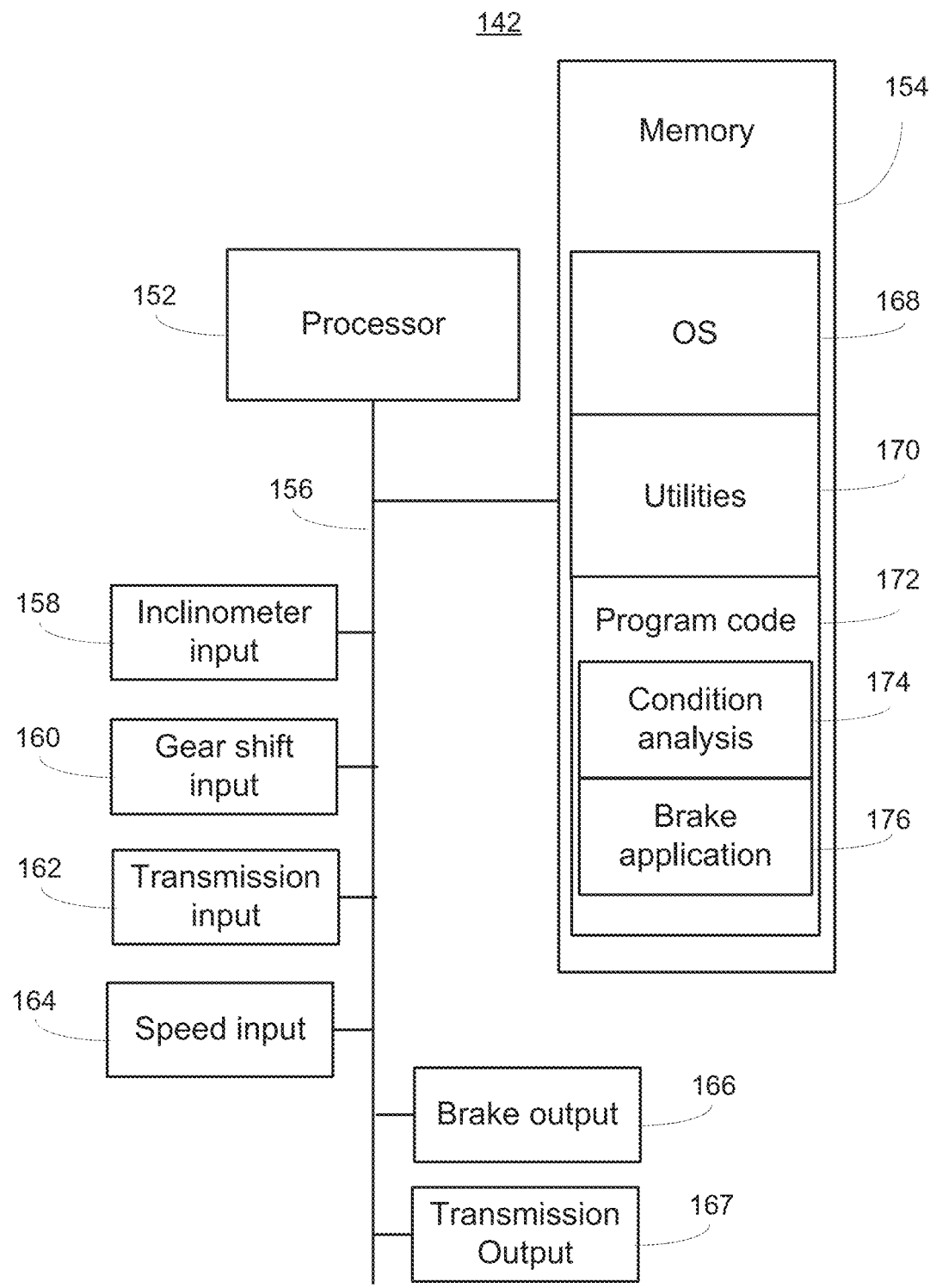
FIG. 3 is a block diagram of an exemplary controller for use in the machine of FIG. 1.

FIG. 3 is a block diagram of the controller 142 of FIG. 2, usable in downshift management. The controller 142 may include a processor 152 and a memory 154, connected via a bus 156. The bus 156 may also connect the processor 152 to a number of inputs and outputs. The inputs may include an inclinometer input 158, a gear shift input 160, a transmission input 162, and a speed input 164. In some embodiments, the transmission input 162 may receive data used to derive speed, so that no separate speed input 164 is required. However, in some runout cases where torque converter and transmission settings cannot be combined with engine rpm to determine speed, the signal associated with the transmission input 162 may not represent the machine speed. This condition is discussed in more detail below. In other embodiments, the speed of the machine 102 may be based on a signal from a separate ground speed sensor (not depicted).

The controller 142 may have a brake output 166 used to apply the brakes via an electric or mechanical interface (not depicted). The controller 142 may also have a transmission output 167 that may be used, in some embodiments, to delay the downshift until after the brakes have been applied and the machine speed is reduced. In other embodiments, the effect of applying the brakes is so fast that no intervention is needed in the normal operation of the transmission 126 responsive to a request to downshift.

The memory 154 may be a physical memory including volatile and/or nonvolatile physical memory including but not limited to RAM, ROM, programmable arrays, flash memory, etc. but does not include carrier wave signals or other propagated media storage. The controller 142 may include an operating system 168, such as a real-time operating system (RTOS) or other known operating system, and utilities 170 that may support routine functions such as communication and diagnostics.

The memory 154 may also include program code 172 that may be used to implement downshift management. The program code 172 may include a module 174 to perform an analysis of current conditions, including determining speed and a module 176 that determines when and how much to apply the brakes, if needed, during a downshift operation.

The controller 142 may be a standalone unit as depicted, or may be included as a function in a different physical computer-oriented processor or engine controller (not depicted). Other embodiments of a standalone controller, the actual functions may be implemented in a different manner, such as a field programmable gate array (FPGA), proportional controller, or may use different specific subsystem combinations that achieve a functional equivalent.

INDUSTRIAL APPLICABILITY

Figure 4:
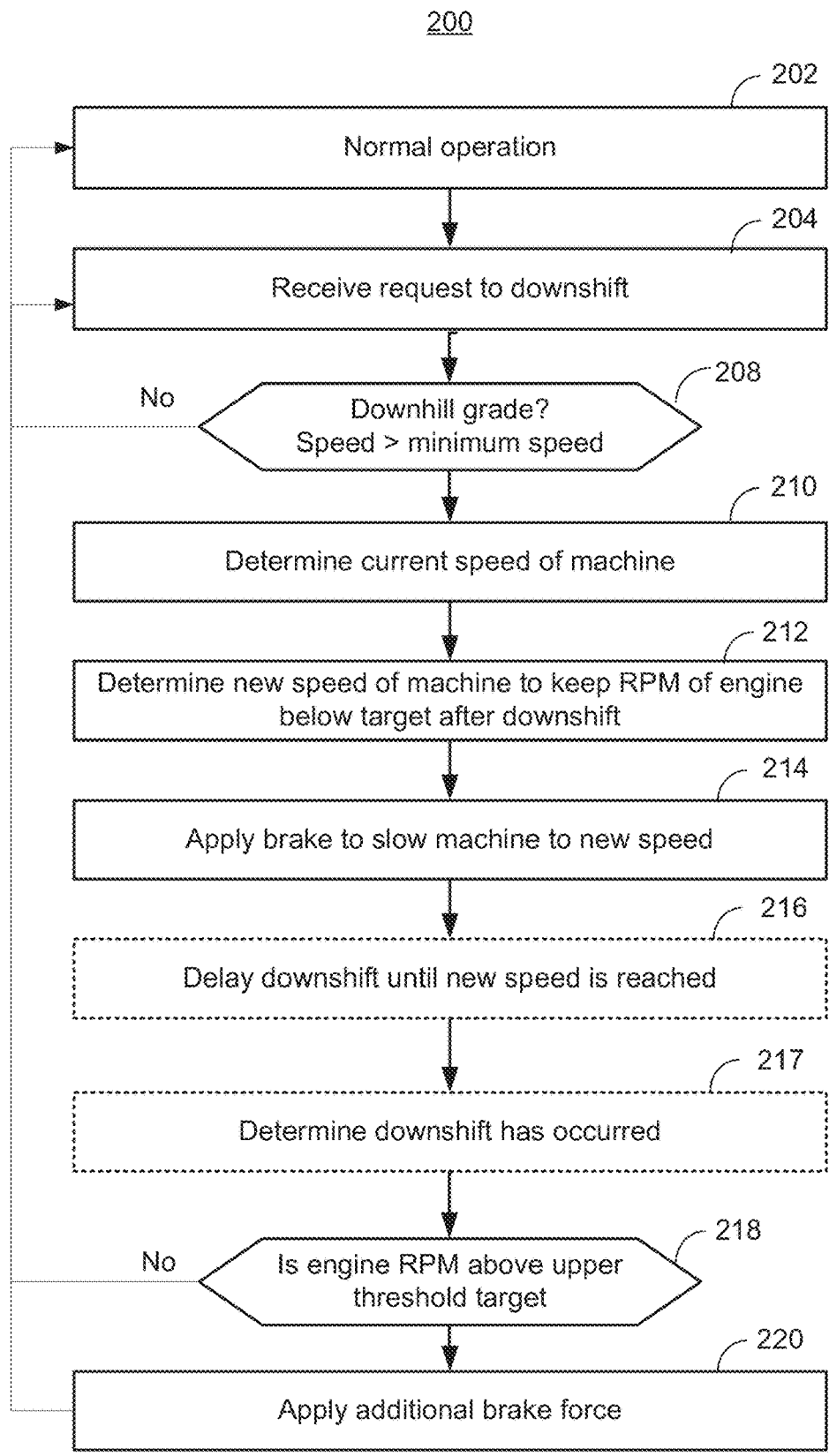
FIG. 4 is a flowchart of an exemplary method of managing a downshift in the machine of FIG. 1.

FIG. 4 is a flowchart 200 of an exemplary method of managing a downshift in a machine, such as machine 102. For the sake of example, the machine 102 as illustrated is track type tractor, such as might be used in a mining or road construction operation. In general, the goal of the method is to slow the machine 102 to a speed that will keep the engine rpm from increasing above a target engine rpm after the downshift is completed.

At block 202 the machine 102 is operating normally, assumed to be fully loaded and traveling in a forward direction. At block 204, a request is received to downshift to a lower gear.

At block 208, a slope signal is analyzed at the controller 142 to determine if the machine 102 is operating on a downhill favorable slope. Additionally, a speed of the machine 102 may be determined to be above a minimum speed. If the machine 102 is operating on a favorable downhill slope and if the optional speed test indicates the speed is above the minimum, operation may continue at block 210. If either condition is not true, the "no" branch may be taken to block 202, which may include executing the requested downshift without automatic application of the brakes.

At block 210, a current speed of the machine 102 may be determined. In machines with a direct groundspeed sensor or integrated GPS sensor, this may be a simple direct measurement. Absent a groundspeed sensor, groundspeed may be calculated as a direct function of the transmission output rpm, or the torque converter rpm and current gear.

At block 212, a runout speed vs. gear and slope table (see, e.g., exemplary Table 1 below) can be used to look up the runout speed for the new gear at the same slope so that a predicted new speed can be estimated. Because the new gear is lower, the anticipated new speed will be less than the current speed. Further adjustments to a target new speed from that found in the table may be made if the known characteristics of the machine 102 indicate that the engine rpm will be above the target engine rpm. That is, the runout speed of the machine 102 for a particular gear and slope may already cause an undesirably high engine rpm. Therefore, a target speed lower than the runout speed may be set for the braking operation, as discussed below.

TABLE 1

| | Speed (mph) | | |
| --- | --- | --- | --- |
| | Slope | | |
| Gear | 1 | 2 | 3 |
| 5° | 2.1 | 4.1 | 6.9 |
| 8° | 2.2 | 4.3 | 7.2 |
| 12° | 2.3 | 4.5 | 7.5 |
| 15° | 2.4 | 4.7 | 7.8 |

Alternatively, a new engine rpm may be calculated in anticipation of the gear change. If the new speed of the machine 102 and gear are known, a minimum rpm of the engine at the new speed may be calculated. That is, an engine rpm/speed relationship by gear for the machine 102 may be determined from its known performance characteristics. Even though the engine rpm may increase due to grade forces after the new gear is initially engaged, the rpm for the current speed can be relatively accurately predicted. In an exemplary embodiment, the target engine rpm may be in a range of 2600 rpm to 2800 rpm, or about 2700 rpm.

At block 214, the brake may be applied to slow the machine 102. In one embodiment, the brakes are simply applied at a given brake pressure and the machine is slowed to and kept at the new speed until the gear change is completed, at which time the brakes are released. A further evaluation of engine rpm may be performed at block 218 below. In another embodiment, the brakes are automatically applied until the target speed is reached without respect to the timing of the gear change. This may be accomplished by direct measurement of groundspeed, or an indirect method using transmission or torque converter measurements, if available.

The technique disclosed may involve but does not require intervention in the gear change process, although the braking operation is generally executed so that braking is completed prior to the gear change. That is, the primary goal is to reduce drivetrain component wear caused by sudden increases in engine rpm. However, even though braking is to be activated in order to reduce drivetrain component wear, the system may additionally minimize any undue harshness caused by brake application by first ramping on the brakes at the least aggressive rate that will also satisfy the component wear constraints for a particular situation (gear change, initial gear, and grade). This may be accomplished by analyzing the required change in speed and using the slope and known relationship of braking force, calculating a brake pressure to apply. Second, when brakes are needed for the sake of drivetrain component protection, the brake controller may slow the machine all the way down to a predicted new "post shift" speed (which may be less than the final speed required to avoid drivetrain component damage). This may be done in order to minimize any discontinuities in brake-assisted-shift deceleration response. That is, if the brakes must come on at all, they may be used to slow the machine all the way down to "post shift" speed, as opposed to just slowing the machine down to a "safe rpm" speed. In an embodiment, the brakes may be applied to slow the machine to the target speed and then released allowing a pause, followed by a secondary deceleration when the physical transmission shift takes place.

In those cases where transmission control is integrated into an overall control scheme, optionally, at block 216, the controller 142 may hold off the downshift operation until the braking operation has completed or the machine 102 has slowed to the desired speed.

At block 217, a determination may be made that the gear shift to the lower gear has occurred. In an embodiment, the controller 142 may have a sensor that monitors the actual engaged gear or may be responsible for the gear change. As discussed above, the brake control process may or may not include the functions to accomplish the actual gear change.

At block 218, the controller 142 may evaluate whether the engine rpm is at the target rpm, for example, 2800 rpm. If not, additional braking force may be applied at block 220 to further slow the machine 102. Even if the engine rpm is above the target rpm, there may be an additional upper threshold engine rpm, which, while above the target rpm, may be considered 'close enough' to prevent excessive wear and allows avoiding application of additional braking force. For example, if the target engine rpm is 2800 rpm, an upper threshold engine rpm may be any engine rpm up to 3300 rpm. The braking force applied at block 220 may be maintained until at least the upper threshold engine rpm is reached. Other machines will likely have other target engine revolutions per minute and operating range revolutions per minute.

After the determination at block 218 that the target engine rpm is met, if the optional upper threshold engine rpm is met, or if additional braking force is applied at block 220, processing may return to the initial monitoring state at block 202.

The ability to manage pre-shift speed and correspondingly post-shift drivetrain rpm benefits machine owner/operators by reducing the stress on driveshaft, torque converter, engine, and other drivetrain components caused by excessive angular speed (rpm) due to downshifts at high speeds. These benefits include lower maintenance costs, longer operating times between servicing, and extended mean time to failure (mttf). The costs associated with drivetrain servicing includes not only the direct parts and labor cost of repairs but the value of the production lost when the machine is unavailable for its work purpose. This may be especially true in mining and construction operations where the equipment cost and value of lost production are very high. While the techniques disclosed here relate to a downshift while running downhill, its usefulness in other situations where a high engine rpm will result from an operation, such as a sudden increase in slope, is apparent.

What is claimed is:

1. A system for controlling wear to drivetrain components during downshifting in a machine, the system comprising:
   a transmission;
   a gear selector electronically coupled to the transmission;
   a brake mechanism configured for remote activation;
   a controller coupled to the gear selector and the brake mechanism, the controller configured to:
      receive a signal via the gear selector to change the transmission from a current gear to a new gear, the new gear being lower than the current gear;
      calculate a new revolutions per minute (rpm), of a drivetrain component, corresponding to operating the transmission in the new gear,
         wherein the drivetrain component is one of a torque converter or an engine;
      determine that the new rpm is above a target rpm;
      determine a new speed of the machine at which the new rpm in the new gear will be at or below the target rpm; and
      activate the brake mechanism to slow the machine to the new speed prior to the transmission engaging the new gear; and
      after changing to the new gear, when an actual new engine rpm is above an upper threshold engine rpm, increase an activation level of the brake mechanism to slow the machine until the upper threshold engine rpm is reached,
         the upper threshold engine rpm exceeding the target rpm.

2. The system of claim 1, wherein the controller is further configured to
   determine a current speed of the machine.

3. The system of claim 1, wherein the controller is further configured to:
   delay changing the transmission to the new gear until the new speed is reached.

4. A method of controlling wear to drivetrain components in a machine during downshifting, the method comprising:
   receiving, by a controller and from a gear selector, a request to downshift to a new gear;
   prior to performing the downshift to the new gear, determining, by the controller, a new revolutions per minute (rpm), of a drivetrain component, corresponding to the new gear,
      wherein the drivetrain component is one of a torque converter or an engine;
   when the new rpm is above a target rpm, determining, by the controller, a new speed of the machine that corresponds to the target rpm when in the new gear;
   applying, by the controller, a remotely activated brake to slow the machine to the new speed prior to shifting to the new gear; and
   after shifting to the new gear, when a new actual engine rpm is above an upper threshold engine rpm higher than the target rpm, applying additional braking force to the brake to further slow the machine to reach the upper threshold engine rpm.

5. The method of claim 4, wherein determining the new speed comprises looking up a known characteristic of a machine speed in the new gear vs. a slope on which the machine is operating.

6. The method of claim 4, wherein the target rpm is in a range of 2700 rpm to 2900 rpm.

7. The method of claim 4, further comprising:
   determining that a current speed of the machine is above a threshold speed and only applying the brake when the current speed is above the threshold speed.

8. The method of claim 4, further comprising:
   delaying shifting to the new gear until the machine has reached the new speed.

9. The method of claim 4, further comprising:
determining that the machine is overrunning the engine based on a slope of the machine, a current gear setting of the machine and an engine rpm.

10. The method of claim 4, further comprising:
determining a current speed of the machine.

11. A method of controlling wear to drivetrain components in a machine during downshifting, the method comprising:
determining a current speed of the machine;
receiving, from a gear selector, a request to downshift from a current gear to a new gear;
prior to changing to the new gear, determining a revolutions per minute (rpm) of a drivetrain component in the new gear,
wherein the drivetrain component is one of a torque converter or an engine;
when the rpm of the drivetrain component in the new gear is above a target rpm, determining a new speed at which the rpm of the drivetrain component will remain below the target rpm;
slowing, using a remotely activated brake mechanism, the machine to the new speed prior to changing to the new gear; and
after changing to the new gear, further slowing the machine using the remotely activated brake mechanism to reach an upper threshold target rpm when an actual rpm of the drivetrain component exceeds the upper threshold target rpm.

12. The method of claim 11, further comprising:
monitoring an actual speed of the machine; and
delaying the change to the new gear until the machine reaches the new speed.

13. The method of claim 11, wherein the target rpm is an engine rpm of about 2700 rpm.

14. The method of claim 13, wherein the upper threshold target rpm is about 3300 rpm at the drivetrain component.

15. The method of claim 11, wherein determining the rpm of the drivetrain component in the new gear comprises predetermining a run-out speed for the machine in the new gear at a current slope.

16. The method of claim 11, wherein determining the new speed of the machine comprises:
determining a slope of a grade on which the machine is moving;
using a lookup table to determine the new speed as a function of the new gear and the slope.

* * * * *